US012335770B2

(12) United States Patent
Parker et al.

(10) Patent No.: US 12,335,770 B2
(45) Date of Patent: *Jun. 17, 2025

(54) INTENT-DRIVEN NETWORK ANALYTICS FOR PREDICTIVE NETWORK SLICE MANAGEMENT

(71) Applicant: Microsoft Technology Licensing, LLC, Redmond, WA (US)

(72) Inventors: Ronald Mark Parker, Manchester, MA (US); Michael Anthony Brown, McKinney, TX (US); Bahareh Sadeghi, Vancouver, WA (US); Mark Gordon Libby, Groton, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,466

(22) Filed: Jan. 19, 2024

(65) Prior Publication Data

US 2024/0244474 A1    Jul. 18, 2024

Related U.S. Application Data

(63) Continuation of application No. 17/741,026, filed on May 10, 2022, now Pat. No. 11,930,390.

(51) Int. Cl.
*H04W 28/02* (2009.01)
*H04L 5/00* (2006.01)

(52) U.S. Cl.
CPC ....... *H04W 28/0242* (2013.01); *H04L 5/0064* (2013.01); *H04L 5/0071* (2013.01); *H04L 5/0076* (2013.01); *H04W 28/0289* (2013.01)

(58) Field of Classification Search
CPC ... H04L 5/0064; H04L 5/0071; H04L 5/0076; H04L 43/0876; H04L 43/16; H04L 41/40; H04L 41/5019; H04W 28/0242; H04W 28/0289

See application file for complete search history.

(56) References Cited

U.S. PATENT DOCUMENTS

2020/0154292 A1*   5/2020   Bor-Yaliniz .......... H04L 41/40

\* cited by examiner

*Primary Examiner* — Khoa Huynh
(74) *Attorney, Agent, or Firm* — ARENTFOX SCHIFF LLP (57) ABSTRACT

Described are examples for providing intent based network slice management using a management data analytics function (MDAF) to predict deficiencies. A network management system receives an intent for a network slice constituent. The network management system configures computing resources for the network slice constituent to satisfy the intent based on expected performance of the computing resources. The network management system receives feedback with respect to actual performance of the network slice constituent. The network management system determines, based on analysis of the feedback by a management data analytics function (MDAF), a predicted deficiency of the network slice constituent not being able to satisfy the intent. The network management system modifies the configuration of the computing resources based on the feedback and the predicted deficiency to satisfy the intent.

19 Claims, 6 Drawing Sheets

INTENT-DRIVEN NETWORK ANALYTICS FOR PREDICTIVE NETWORK SLICE MANAGEMENT

CROSS-REFERENCE TO RELATED APPLICATIONS

This application is a continuation of U.S. patent application Ser. No. 17/741,026, filed on May 10, 2022, and entitled "INTENT-DRIVEN NETWORK ANALYTICS FOR PREDICTIVE NETWORK SLICE MANAGEMENT," the disclosure of which is incorporated by reference herein in its entirety.

BACKGROUND

A radio access network (RAN) may provide multiple user devices with wireless access to a network. The user devices may wirelessly communicate with a base station, which forwards the communications towards a core network. A core network may include multiple nodes or functions. For example, a 5G core network may include one or more Access and Mobility Management Functions (AMFs), Session Management Functions (SMFs), and a User Plane Functions (UPFs). For instance, the AMF may be a control node that processes the signaling between the UEs and the core network. Generally, the AMF provides quality of service (QoS) flow and session management. All user Internet protocol (IP) packets are transferred through the UPF. The UPF provides UE IP address allocation as well as other functions. The UPF may be connected to IP Services. The IP Services may include the Internet, an intranet, an IP Multimedia Subsystem, a packet switched (PS) Streaming Service, and/or other IP services.

A virtualized radio access network may utilize datacenters with generic computing resources for performing RAN processing for network functions. For example, instead of performing PHY and MAC layer processing locally on dedicated hardware, a virtualized radio access network may forward radio signals from the radio units to an edge datacenter for processing and similarly forward signals from the edge datacenter to the radio units for wireless transmission. As another example, core network functions may be implemented on generic cloud resources at various datacenters. Because the network datacenters utilize generic computing resources, a virtualized RAN may provide scalability and fault tolerance for network processing. Conventionally, whether using dedicated hardware or more generic computing resources, network configuration has been performed by pushing a network configuration down to lower level management functions until each network function is configured.

In complex systems, such as cellular networks in general and in cloud-based virtualized deployments specifically, variations in system resources and network conditions may result in network configurations that are deficient in terms of performance or efficiency. Techniques to adapt network configurations to changing conditions may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of network configuration, including: receiving, at a network management function, an intent for a network slice constituent; configuring computing resources for the network slice constituent to satisfy the intent based on expected performance of the computing resources; receive feedback with respect to actual performance of the network slice constituent; determining, based on analysis of the feedback by a management data analytics function (MDAF), a predicted deficiency of the network slice constituent not being able to satisfy the intent; and modifying the configuration of the computing resources based on the feedback and the predicted deficiency to satisfy the intent.

In some aspects, the techniques described herein relate to a method, wherein receiving the intent includes receiving an intent including a lower threshold and an upper threshold for performance of the network slice constituent.

In some aspects, the techniques described herein relate to a method, wherein receiving feedback with respect to actual performance of the network slice constituent includes monitoring the performance of the network within the lower threshold and the upper threshold.

In some aspects, the techniques described herein relate to a method, wherein determining the deficiency of the network slice constituent not being able to satisfy the intent includes receiving a prediction that a likelihood of satisfying the intent is less than a threshold.

In some aspects, the techniques described herein relate to a method, wherein determining the predicted deficiency of the network slice constituent includes training a machine learning model at the MDAF to predict a demand on the network slice constituent.

In some aspects, the techniques described herein relate to a method, wherein the demand on the network slice constituent is a network traffic level.

In some aspects, the techniques described herein relate to a method, wherein modifying the configuration of the computing resources based on the feedback and the predicted deficiency to satisfy the intent includes allocating additional computing resources to the network slice constituent to increase a capacity of the network slice constituent to satisfy the intent.

In some aspects, the techniques described herein relate to a method, wherein the predicted deficiency is with respect to a constraint on a cost or efficiency of the intent, and wherein modifying the configuration of the computing resources includes reducing an allocation of computing resources to satisfy the intent at a lower cost.

In some aspects, the techniques described herein relate to a method, wherein determining the predicted deficiency of the network slice constituent with respect to the intent includes receiving a recommended action from the MDAF to satisfy the intent.

In some aspects, the techniques described herein relate to a method, wherein receiving feedback with respect to actual performance of the network function includes receiving feedback at two or more levels of: a network function management function (NFMF), a network slice subnet management function (NSSMF), or a network slice management function (NSMF).

In some aspects, the techniques described herein relate to a system for network configuration, including: a network management function configured to: receive an intent for a network slice constituent; configure computing resources for the network slice constituent to satisfy the intent based on expected performance of the computing resources; determine, based on analysis of feedback with respect to actual performance of the network slice constituent by a management data analytics function (MDAF), a predicted deficiency of the network slice constituent not being able to satisfy the intent; and modify the configuration of the computing resources based on the feedback and the predicted deficiency to satisfy the intent; and the MDAF configured to: receive feedback with respect to actual performance of the network slice constituent; and predict a deficiency of the network slice constituent not being able to satisfy the intent based on analysis of the feedback.

In some aspects, the techniques described herein relate to a system, wherein the network function is configured to receive an intent including a lower threshold and an upper threshold for performance of the network slice constituent.

In some aspects, the techniques described herein relate to a system, wherein the feedback with respect to actual performance of the network slice constituent includes performance metrics within the lower threshold and the upper threshold.

In some aspects, the techniques described herein relate to a system, wherein the MDAF is configured to predict a likelihood of the configured network slice constituent satisfying the intent.

In some aspects, the techniques described herein relate to a system, wherein the MDAF is configured with a trained machine learning model to predict a demand on the network slice constituent.

In some aspects, the techniques described herein relate to a system, wherein the demand on the network slice constituent is a network traffic level.

In some aspects, the techniques described herein relate to a system, wherein the network management function is configured to allocate additional computing resources to the network slice constituent to increase a capacity of the network slice constituent to satisfy the intent.

In some aspects, the techniques described herein relate to a system, wherein the predicted deficiency is with respect to a constraint on a cost or efficiency of the intent, and wherein the network management function is configured to reduce an allocation of computing resources to satisfy the intent at a lower cost.

In some aspects, the techniques described herein relate to a system, wherein the MDAF is configured to provide a recommended action to satisfy the intent.

In some aspects, the techniques described herein relate to a non-transitory computer-readable medium storing computer executable instructions for intent based network slice management, including instructions to: receive, at a network management function, an intent for a network slice constituent configure computing resources for the network slice constituent to satisfy the intent based on expected performance of the computing resources; receive feedback with respect to actual performance of the network slice constituent; determine, based on analysis of the feedback by a management data analytics function (MDAF), a predicted deficiency of the network slice constituent not being able to satisfy the intent; and modify the configuration of the computing resources based on the feedback and the predicted deficiency to satisfy the intent.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

The concept of intent driven network management allows a client to specify a specific goal (or intent target) to be satisfied within a set of specific expectations (also referred to as contexts). The intent-server, e.g., the intent-handler or the service provider, provides the intent-client with updates regarding the status of the intent. If the intent-server cannot achieve the goal specified as the intent, then the intent-server may reject the intent. If a satisfied intent is degraded and no longer fully satisfied, the intent-server notifies the client of the degradation. The client then may choose to update the intent and set a new goal.

In complex systems, such as cellular networks in general and in cloud-based virtualized deployments specifically, the variations in system resources and network conditions may result in deficiencies of network configurations. For example, a network configuration may no longer satisfy an intent if underlying computing resources perform below expectations or if demand increases. Conversely, if demand falls, a network configuration may have allocated too many computing resources and operate inefficiently in terms of cost. One approach to correcting deficiencies of a network configuration is for the intent-server to report the deficiency and wait for the intent-client to provide an updated intent. Such an approach, however, may be reactive and only correct a deficiency after the intent is not satisfied. Further, the approach involves communication between and intent-server and the intent-client, which may add overhead and involve decisions that are further from the computing resources.

In an aspect, this disclosure describes various examples related to network management for virtualized cellular networks using network analytics to predict deficiencies of a network configuration for satisfying an intent. For example, network management functions may configure network functions within a 5G radio access network (RAN) and/or 5G core network. A network management function may modify the network configuration to satisfy the intent without receiving an updated intent from the intent-client. A management data analytics function (MDAF) may monitor performance of the network configuration with respect to the intent to predict a deficiency. For example, a deficiency may be predicted based on a likelihood that the network configuration will not satisfy the intent. In some implementations, the MDAF may include a machine-learning model to predict demand for network services. The prediction of the deficiency may be based on changes to the predicted demand. For example, an increase in demand may result in a current configuration having insufficient resources to satisfy the intent. The network management function may modify the configuration of the computing resources based on the feedback and the predicted deficiency to satisfy the intent.

In an aspect, prediction of deficiencies by a MDAF may improve performance of network management functions and the network itself. For example, by predicting deficiencies, the MDAF may allow a lower level management function to modify a network configuration without waiting for a higher level management function to respond to a degraded intent. Accordingly, the deficiency may be prevented from occurring or resolved more quickly in comparison to a larger reconciliation loop involving updated intents from higher level management functions. Further, less communication may be needed between management functions, reducing overhead of such communications. In some implementations, prediction of a deficiency with respect to a constraint may allow the network configuration to be regularly improved, for example, to operate at a lower cost or with greater efficiency.

Figure 3:
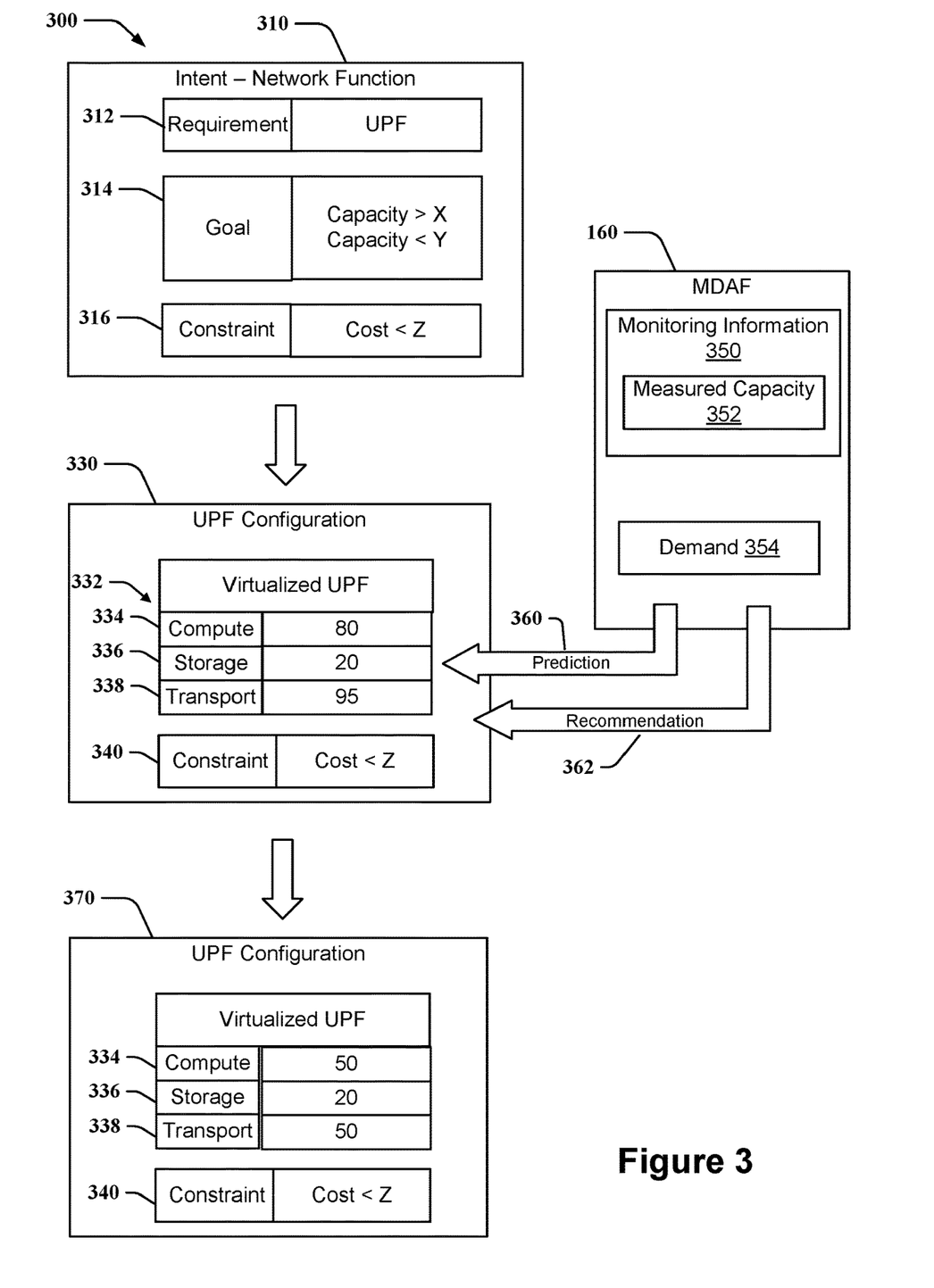
FIG. 3 is diagram of example intents, configurations, and feedback, in accordance with aspects described herein.
Figure 4:
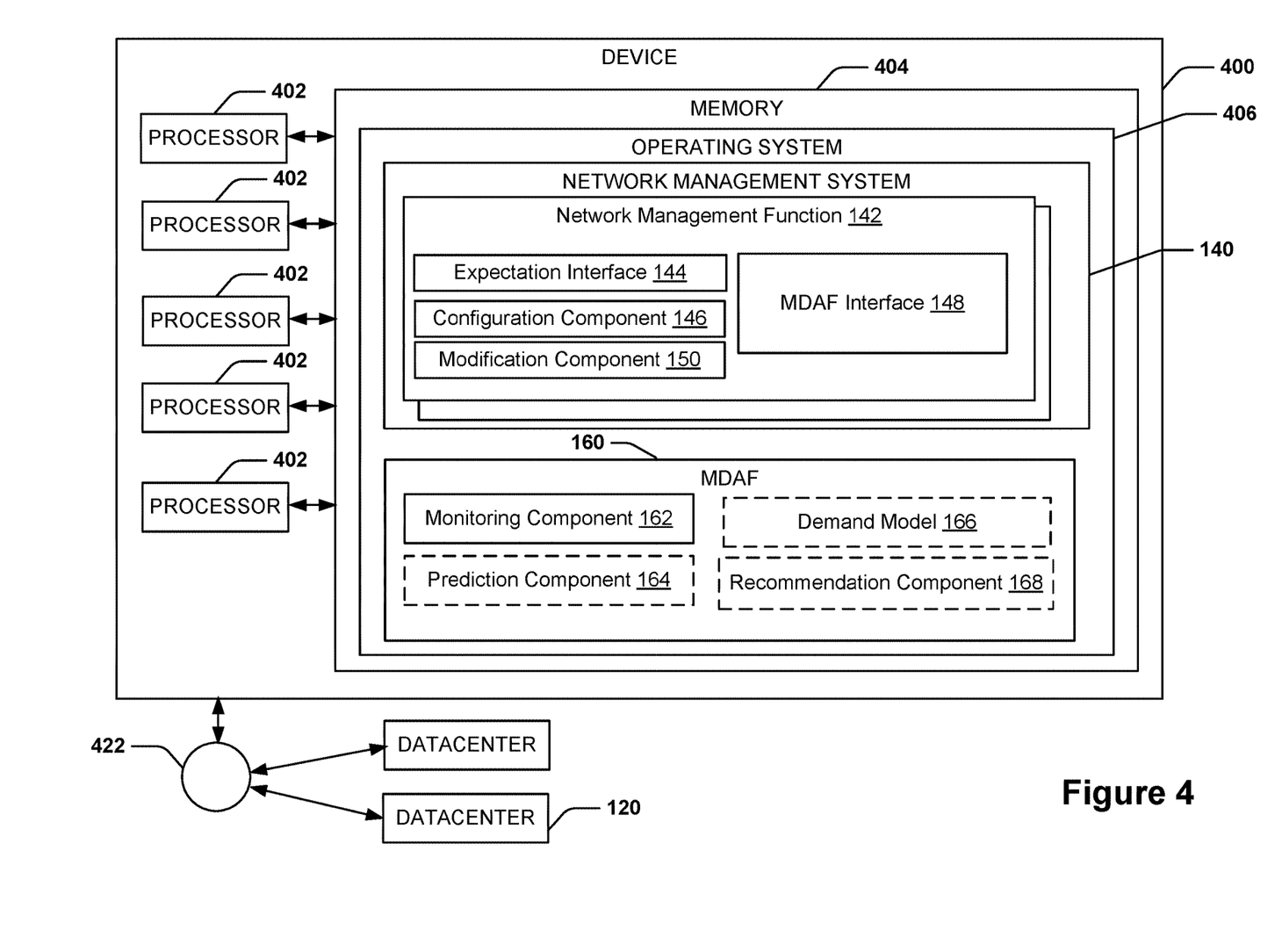
FIG. 4 is a schematic diagram of an example of a device for intent based network slice management, in accordance with aspects described herein.
Figure 5:
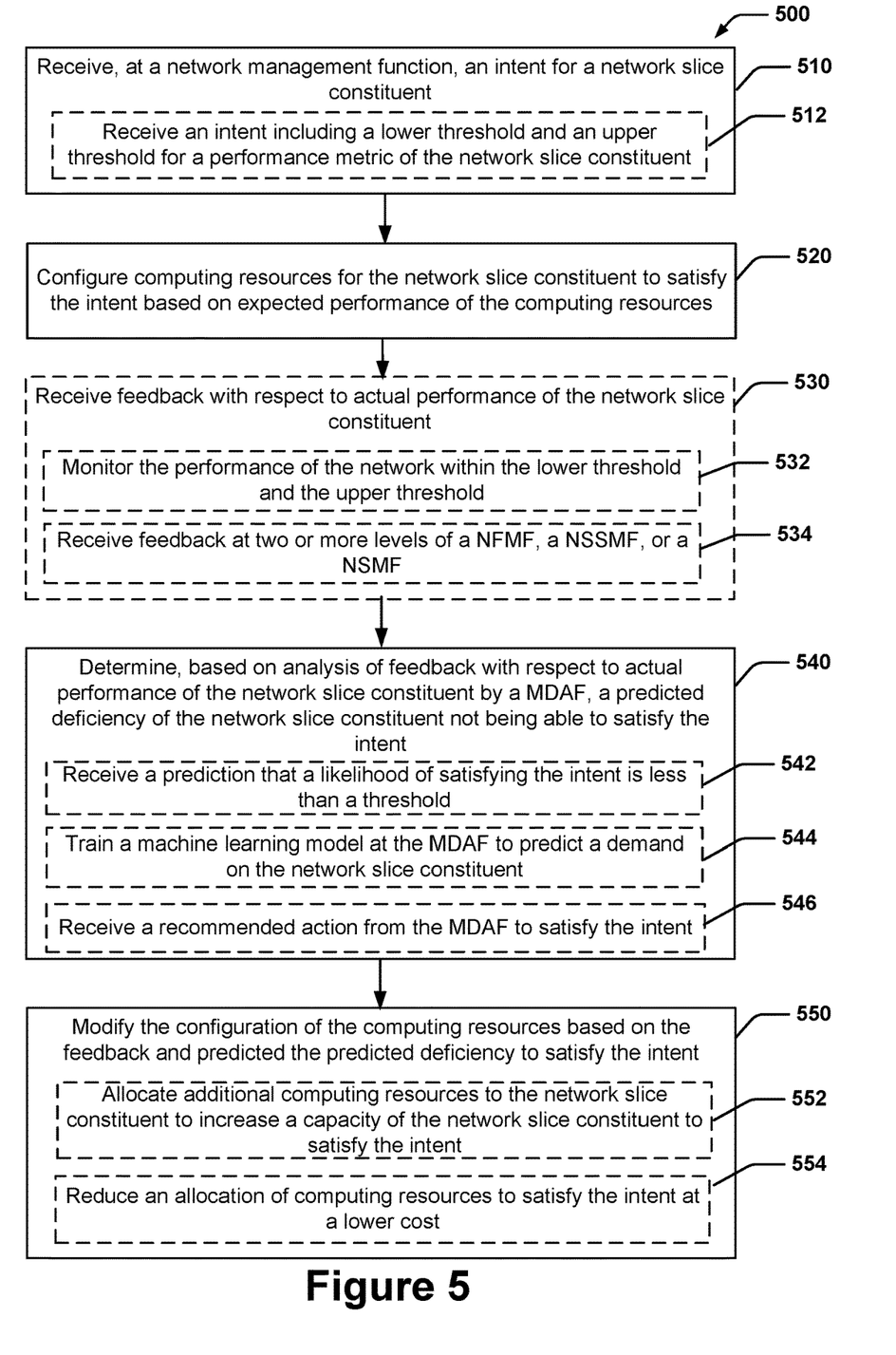
FIG. 5 is a flow diagram of an example of a method of managing network slice constituents, in accordance with aspects described herein.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
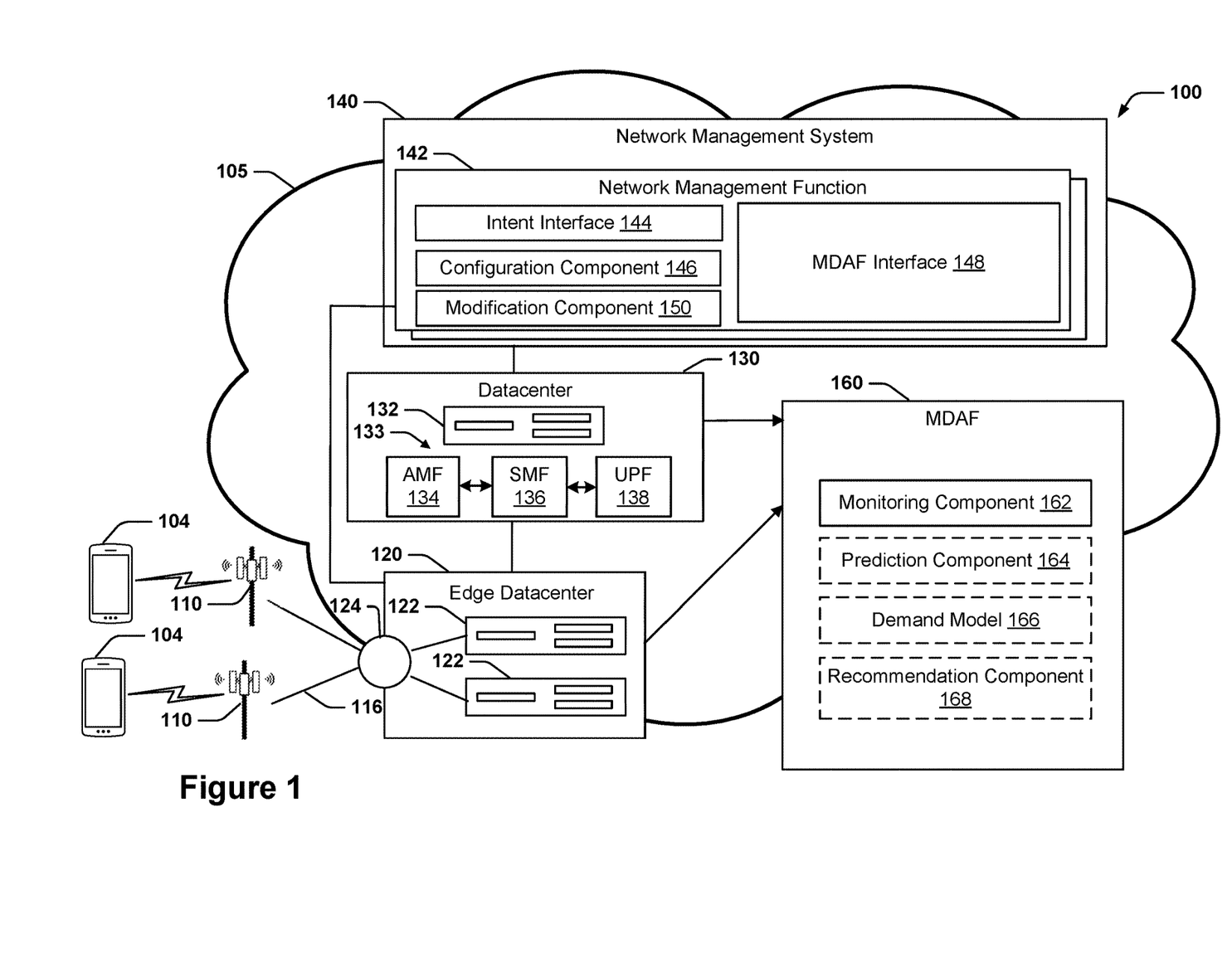
FIG. 1 is a diagram of an example of an architecture for network management of a virtualized cellular network, in accordance with aspects described herein.

FIG. 1 is a diagram of an example of an architecture for management of a virtualized cellular network 100. The virtualized cellular 100 may be implemented on a cloud network 105 to provide access for user equipment (UEs) 104. The virtualized cellular 100 may include radio units 110, one or more edge datacenters 120, one or more datacenters 130, a network management system 140, and an MDAF 160.

The radio units 110 may include antennas configured to transmit and/or receive radio frequency (RF) signals. In some implementations, the radio units 110 may include RF processing circuitry. For example, the radio units 110 may be configured to convert the received RF signals to baseband samples and/or convert baseband samples to RF signals. The radio units 110 may be connected to the edge datacenter 120 via front-haul connections 116. The front-haul connections 116 may be wired connections such as fiber optic cables.

The edge datacenter 120 may include computing resources 122 and a switch 124, which may be connected to RUs 110 via the front-haul connections 116. The edge datacenter 120 may provide a virtualized base station for performing RAN processing for one or more cells. For example, the computing resources 122 may be hardware servers or virtual servers. The servers may be generic computing resources that can be configured to perform specific RAN protocol stacks including, for example, physical (PHY) layer, media access control (MAC) layer protocol stacks, radio link control (RLC) layer, and a radio resource control (RRC) layer. In some implementations, PHY layer processing may be more resource intensive than higher layer processing and may benefit from performance close to the RUs 110. The computing resources 122 may be connected to the switch 124 and to each other via connections, which may be wired connections such as Ethernet.

The datacenter 130 may include computing resources 132. Unlike the edge datacenter 120, the datacenter 130 may lack a direct connection to RUs 110. Generally, the datacenter 130 may be more centrally located, be connected to multiple other datacenters, and/or have greater computing resources 132 than an edge datacenter 120. In some implementations, higher layer network functions and/or core network functions may be performed at a datacenter 130. For example, the datacenter 130 may instantiate network functions 133 such one or more Access and Mobility Management Functions (AMFs) 134, a Session Management Function (SMF) 136, and a User Plane Function (UPF) 138.

The network management system 140 may provide a network operator with tools for configuring the virtualized cellular network 100. In an aspect, the network management system 140 provides intent based configuration of the virtualized cellular network 100. An intent specifies the expectations including requirements, goals, and constraints for a specific service or network management workflow. An intent is typically understandable by humans, and also can be interpreted by a machine without any ambiguity. In contrast to an imperative configuration that specifies how a network or component is to perform, an intent expresses what a network should achieve. For example, an intent may express the metrics that are be achieved and not how to achieve the metrics.

In an aspect, the network management system 140 includes one or more network management functions 142. Each network management function 142 may receive an intent and output one or more lower-level intent expectations or a configuration. For example, the network management function 142 may include an intent interface 144 configured to receive an intent for a network slice constituent. The network management function 142 may include a configuration component 146 configured to configure computing resources for a network slice constituent to satisfy the intent based on expected performance of the computing resources. The network management function 142 may include an MDAF interface 148 configured to determine, based on analysis of feedback with respect to actual performance of the network slice constituent by the MDAF 160, a deficiency of the network slice constituent not being able to satisfy the intent. The network management function 142 may include a modification component 150 configured to modify the configuration of the computing resources based on the feedback and the deficiency to satisfy the intent.

In some implementations, the network management functions 142 are slice based network management functions arranged in a hierarchical order. For instance, the network management functions 142 may include a communication service management function (CSMF), network slice management function (NSMF), a network slice subnet management function (NSSMF), or a network function management function (NFMF). The slice based network management functions may manage network constituents such as a slice, a slice subnet, or a network function (NF). Each management function 142 may provide an intent expectation for a network constituent to a lower level network management function and/or to a NF, which receives the intent expectation as an intent. For example, the CSMF may provide an intent for one or more slices to the NSMF, which may provide an intent for one or more slice sub-nets to the NSSMF. The NSSMF may provide an intent for one or more NFs to the NFMF. The NFMF may instantiate the NFs on the computing resources 122, 132 at the datacenters 120, 130 (possibly via an infrastructure service management system) and communicate with the active NFs.

In some implementations, the network management system 140 may be implemented on cloud resources such as a datacenter 130. In some implementations, the MDAF 160 may also be implemented on the cloud resources, and there may be a logical divide between the network management system 140 and the MDAF 160. In other implementations, the network management system 140 may be external to the cloud network 105 and may communicate with the MDAF 160 via a network connection.

The MDAF 160 may be configured to monitor a status of the computing resources 122, 132 and/or network functions deployed on the computing resources 122, 132. The MDAF 160 may collect metrics generated by the cloud network 105 (e.g., data rates, processor/memory utilization) and/or metrics generated by network functions (e.g., number of UEs, latency, throughput). In some implementations, the MDAF 160 may be associated with a level of network management functions. The MDAF 160 may collect network status information and/or metrics relevant to the associated level of network management functions. For instance, a network slice (NS) level MDAF may collect status information and/or metrics for network slices and a network slice sub-net (NSS) level MDAF may collect status information and/or metrics for slice sub-nets.

The MDAF 160 may include a monitoring component 162 configured to receive feedback with respect to actual performance of the network slice constituent. The MDAF 160 may optionally include a prediction component 164 configured to predict that a likelihood of satisfying the intent is less than a threshold. The MDAF 160 may optionally include a demand model 166 configured to predict a demand on the network slice constituent. The MDAF 160 may optionally include a recommendation component 168 configured to provide a recommended action to the network management function 142 to satisfy the intent.

Figure 2:
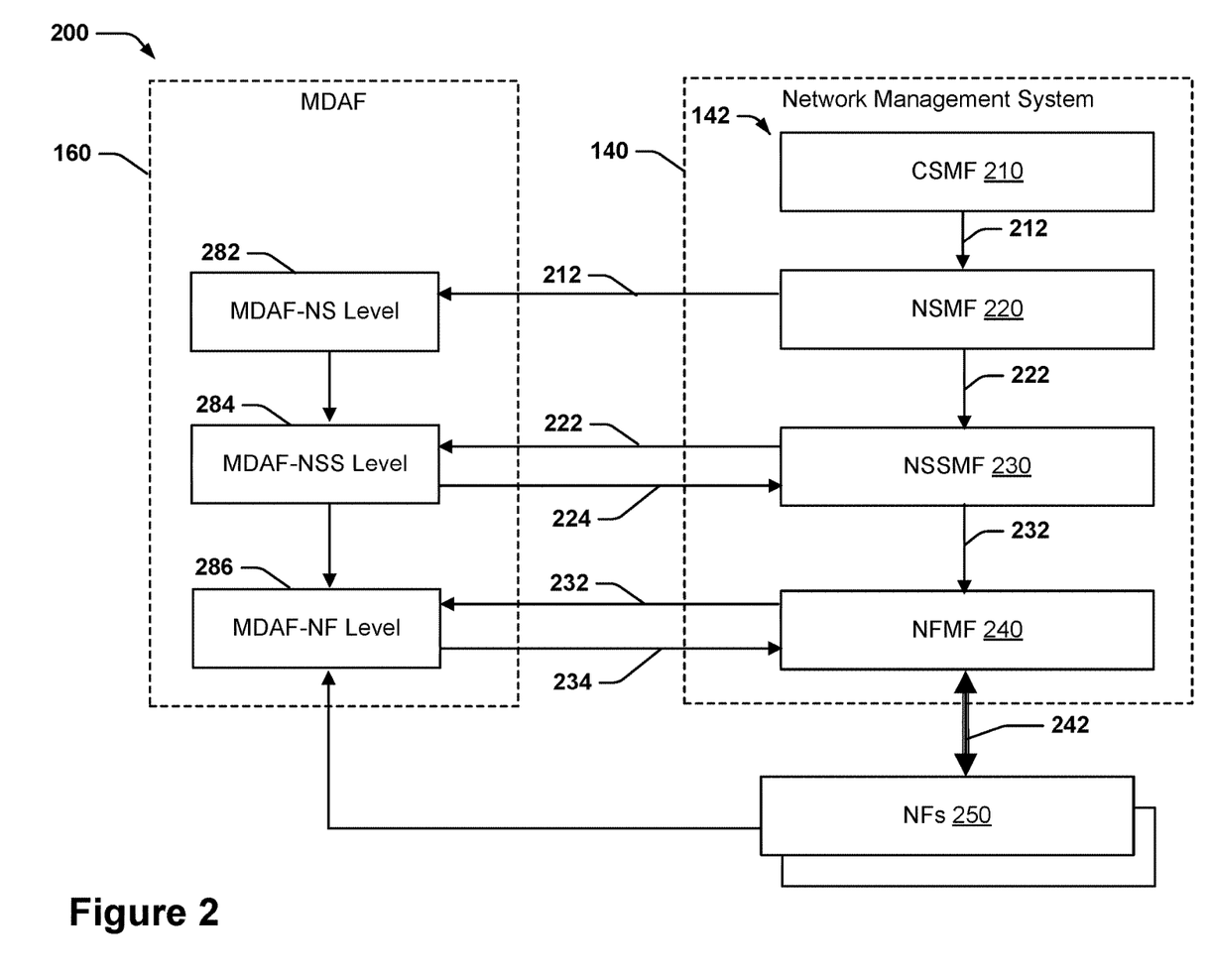
FIG. 2 is a diagram of an example of network slice based management of a virtualized cellular network, in accordance with aspects described herein.

FIG. 2 is a diagram 200 of an example of network slice based management and analytics of a virtualized cellular network. The network management system 140 may include hierarchical management functions 142. For example, the management functions 142 may include a CSMF 210, a NSMF 220, a NSSMF 230, and a NFMF 240. Each management function 142 may be an intent based management function that receives an intent from a higher level and generates an intent for a lower level and/or a configuration of NFs 250. For example, the CSMF 210 may receive an intent (e.g., for a service) from a network operator and generate an intent 212 for the NSMF 220. The NSMF may receive the intent 212 as a new intent (e.g., for a network slice) and generate one or more intents 222 for the NSSMF (e.g., intent for various subnets). The NSSMF 230 may receive the intent 222 as a new intent for a subnet and generate one or more intent 232 for the NFMF 240 (e.g., intent defining required network functions). The NFMF 240 may receive the intent 232 and generate configurations 242 for NFs 250.

In some implementations, any of the NSMF 220, NSSMF 230, or NFMF 240 may include the MDAF interface 148 for communicating with the MDAF 160 to determine a deficiency of the network slice constituent not being able to satisfy the intent. For example, a network management function may provide an intent to the MDAF 160 to monitor for deficiencies and receive a prediction of a deficiency and/or a recommendation from the MDAF 160.

In some implementations, MDAF 160 may operate at various levels corresponding to the hierarchical network management functions 142 (e.g., MDAF-NS level 282, MDAF-NSS level 284, and MDAF-NF level 286). For example, the MDAF 160 may include a separate component for each level that calculates metrics or performs analysis relevant to the level. The different levels may access a common pool of monitoring information such as measurements or data streams from the NFs 250 or underlying computing resources. In some implementations, higher levels of the MDAF 160 may provide analysis results to lower levels of the MDAF 160. For example, the MDAF-NSS level 284 may provide a prediction of network load to the MDAF-NF level 286. Each level of the MDAF 160 may provide a prediction to the corresponding network management function with respect to a configured network slice constituent not being able to satisfy the intent. For example, the MDAF-NSS level 284 may provide a prediction 224 with respect to the intent 222 for a network slice subnet, or the MDAF-NF level 286 may provide a prediction 234 with respect to the intent 232 for a network function.

FIG. 3 is a diagram 300 illustrating modification of a configuration of network resources based on a predicted deficiency. For example, a network management function 142 such as the NFMF 240 may receive an intent 310 for a network function such as the UPF 138. For instance, the intent 310 may include a requirement 312 for a UPF with a goal 314 of a capacity greater than X (lower threshold) and less than Y (higher threshold). The capacity goal 314 may be, for example, a cumulative throughput for a service or an additional throughput capacity for the service. Further, the intent 310 may specify a constraint 316 of a cost less than Z.

The NFMF 240 may be responsible for satisfying the intent 310 by configuring a UPF 138. The NFMF 240 may generate the UPF configuration 330 for a virtualized UPF. For instance, the NFMF 240 may instantiate the virtualized UPF on the cloud network 105 by providing the UPF configuration 330 to a cloud infrastructure service management (CISM) system. The UPF configuration 330 may specify levels of computing resources such as compute resources 334, storage resources 336, and transport resources 338 for providing the virtualized UPF. The NFMF 240 may determine the computing resources 332 based on expected performance of the computing resources. For instance, the expected performance may be based on a nominal performance indicated by the CISM, the performance of other network slices, or historical performance data. In some implementations, the configuration 330 may include a constraint 340 such as a maximum cost.

In an aspect, the MDAF 160 may receive information with respect to a performance of network resources or a status of the network. For example, the MDAF 160 may receive monitoring information 350 from the computing resources 122, 132 and/or the network management function 142. In some implementations, the monitoring information 350 may include performance or status information regarding compute resources, storage resources, or transport resources in the network 105. For instance, the monitoring information 350 may indicate a status such as available, degraded, or unavailable for each type of resource in one or more regions or at specific datacenters. The performance information may specify one or more relevant performance metrics such as compute CPU utilization, storage capacity, or transport bandwidth. The MDAF 160 may also collect information regarding the status or performance of network constituents such as NFs 250, network slice subnets, or network slices.

The MDAF 160 may analyze feedback with respect to actual performance of the network slice constituent to predict a deficiency. The MDAF 160 may provide a prediction 360 of the deficiency. The feedback may include, for example, measured metrics corresponding to the capacity goal 314 of the intent. For instance, the MDAF 160 may monitor an actual throughput capacity 352 of the UPF 138. In some implementations, the feedback may remain within the goals or thresholds defined by the intent 310. That is, the MDAF 160 may not only observe a deficiency of not being able to satisfy the intent 310, the MDAF may predict that a deficiency is likely to occur even though the intent is currently satisfied. For example, the MDAF 160 may include one or more machine-learning models for predicting performance of a network constituent. In some implementations, the MDAF 160 may include a demand model 166. The demand model 166 may be trained on historical usage patterns for a service. In some implementations, the demand model 166 may operate at a higher level than the network constituent. For example, a demand model for a network slice or network slice-subnet may predict demand 354 on a UPF 138 based on load on other network functions. For example, an increase in activity at AMF 134 or SMF 136 (e.g., additional devices connecting or requesting sessions) may predict greater demand (i.e., greater network traffic) on UPF 138. As another example, a demand model may provide time based predictions of demand for a service (e.g., declining usage of a navigation service after rush hour).

In some implementations, the MDAF 160 may include the recommendation component 168 to provide a recommendation 362 based on a predicted deficiency. For example, in response to a predicted drop in demand, in addition to predicting that a current configuration is likely to not satisfy an intent, the recommendation component 168 may provide a recommendation 362 such as to decrease allocated transport resources to reduce a cost.

The modification component 150 may modify the configuration 330 in response to the prediction 360 and/or the recommendation 362. For example, in response to the predicted drop in demand and the recommendation to decrease allocated transport resources, the modification component 150 may generate the UPF configuration 370 having allocated compute resources 334 and transport resources 338 lower than the UPF configuration 330. Accordingly, the UPF 138 may be more likely to satisfy the constraint 316 on the cost.

FIG. 4 is a schematic diagram of an example of a device 400 (e.g., a computing device) for network configuration. The device 400 may be an example of a computing resource 132 such as a server at a datacenter 130 that hosts the network management system 140 and/or the MDAF 160. The device 400 is connected to other servers within the datacenter via a switch 422 and may be connected to servers at other datacenters.

In an example, device 400 can include one or more processors 402 and/or memory 404 configured to execute or store instructions or other parameters related to providing an operating system 406, which can execute one or more applications or processes, such as, but not limited to, at least one of a network management function 142 or an MDAF 160. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the network management system 140 may optionally include one or more network management functions 142 (e.g., CSMF 210, NSMF 220, NSSMF 230, or NFMF 240), each network management function 142 including an intent interface 144, a configuration component 146, an MDAF interface 148, and a modification component 150.

In an example, the MDAF 160 may include the monitoring component 162. The MDAF 160 may optionally include one or more of the prediction component 164, the demand model 166, or the recommendation component 168.

FIG. 5 is a flow diagram of an example of a method 500 for network configuration based on network analytics. For example, the method 500 can be performed by a device 400 and/or one or more components thereof to configure and maintain one or more network slice constituents (e.g., network functions 133, 250) within a cloud network 105 to provide a network service. For instance, the method 500 may be performed by a device implementing a network management function 142 and/or the MDAF 160.

At block 510, the method 500 may include receiving, at a network management function, an intent for a network slice constituent. In an example, the network management function 142 and/or the intent interface 144, e.g., in conjunction with processor 402, memory 404, and operating system 406, can receive an intent 310 for a network slice constituent. In some implementations, at sub-block 512, the block 510 may include receiving an intent including a lower threshold (X) and an upper threshold (Y) for a performance metric of the network slice constituent.

At block 520, the method 500 may include configuring computing resources for the network slice constituent to satisfy the intent based on expected performance of the computing resources. In an example, the network management function 142 and/or the configuration component 146, e.g., in conjunction with processor 402, memory 404, and operating system 406, can configure computing resources 122, 132 for the network slice constituent (e.g., UPF 138) to satisfy the intent 310 based on expected performance of the computing resources.

At block 530, the method 500 includes receiving feedback with respect to actual performance of the network slice constituent. In an example, the network management function 142, the MDAF 160 and/or the monitoring component 162, e.g., in conjunction with processor 402, memory 404, and operating system 406, can receive feedback with respect to actual performance of the network slice constituent. For instance, in some implementations, a network management function (e.g., NFMF 240 may communicate with the network slice constituent (e.g., NF 250) to receive feedback such as performance metrics. In some implementations, the MDAF 160 and/or monitoring component 162 may additionally or alternatively receive feedback. For example, in some implementations, the MDAF 160 may receive performance information from the computing resources 122, 132 instantiating the network slice constituents. In some implementations, at sub-block 532, the block 530 may optionally include monitoring the performance of the network within the lower threshold and the upper threshold. That is, the feedback may indicate that the network slice constituent is currently satisfying the intent. In some implementations, at sub-block 534, the block 530 may optionally include receiving feedback at two or more levels of a NFMF 240, a NSSMF 230, or a NSMF 220. For instance, the MDAF-NF level 286, the MDAF-NSS level 284, and/or the MDAF-NS level 282 may receive feedback.

At block 540, the method 500 includes determining, based on analysis of feedback with respect to actual performance of the network slice constituent by a MDAF, a predicted deficiency of the network slice constituent not being able to satisfy the intent. In an example, the network management function 142, the MDAF interface 148, the MDAF 160 and/or the prediction component 164, e.g., in conjunction with processor 402, memory 404, and operating system 406, can determine, based on analysis of feedback with respect to actual performance of the network slice constituent, a predicted deficiency of the network slice constituent not being able to satisfy the intent. In some implementations, at sub-block 542 the block 540 may optionally include receiving a prediction 360 that a likelihood of satisfying the intent is less than a threshold. For instance, the network management function 142 may receive the prediction 360 from the MDAF 160 and/or the prediction component 164 via the MDAF interface 148. In some implementations, at sub-block 544, the block 540 may optionally include training a machine learning model at the MDAF to predict a demand on the network slice constituent. For instance, the MDAF 160 may train the demand model 166 to predict the demand on the network slice constituent. For example, the demand on the network slice constituent may be a network traffic level. In some implementations, at sub-block 546, the block 540 may optionally include receiving a recommended action from the MDAF 160 to satisfy the intent. For example, the network management function 142 may receive the recommendation 362 from the MDAF 160 and/or the recommendation component 168 via the MDAF interface 148.

At block 550, the method 500 includes modifying the configuration of the computing resources based on the feedback and predicted the predicted deficiency to satisfy the intent. In an example, the network management function 142 and/or the intent modification component 150, e.g., in conjunction with processor 402, memory 404, and operating system 406, can modify the configuration 330 of the computing resources 122, 132 based on the feedback and the predicted deficiency to satisfy the intent 310. In some implementations, at sub-block 552, the block 550 may optionally include allocating additional computing resources to the network slice constituent to increase a capacity of the network slice constituent to satisfy the intent 310. In some implementations, at sub-block 554, the block 550 may optionally include reducing an allocation of computing resources to satisfy the intent 310 at a lower cost.

Figure 6:
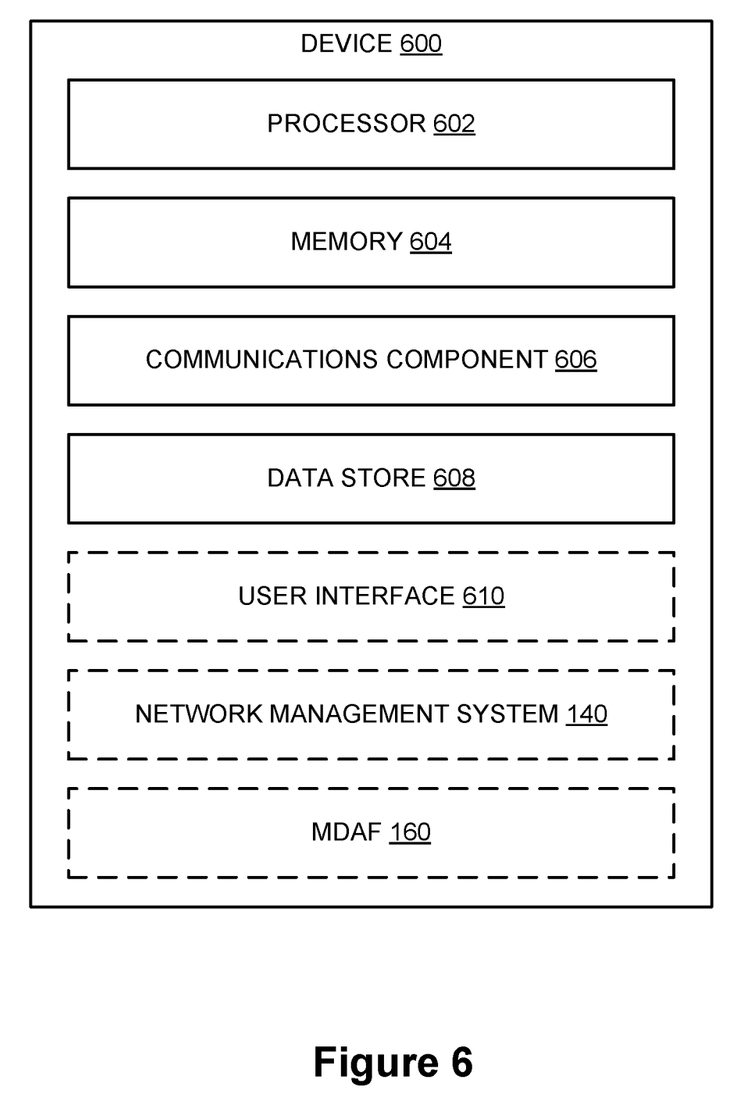
FIG. 6 is a schematic diagram of an example of a device for performing functions described herein, in accordance with aspects described herein.

FIG. 6 illustrates an example of a device 600 including additional optional component details as those shown in FIG. 4. In one aspect, device 600 may include processor 602, which may be similar to processor 402 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 404 such as for storing local versions of operating systems (or components thereof) and/or applications being executed by processor 602, such as the network management system 140, the MDAF 160, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc.) not currently being executed by processor 602. In addition, data store 608 may be a data repository for network management system 140, MDAF 160, etc.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include a network management system 140 for configuring network resources for a network slice constituent to satisfy an intent based on expected performance of the computing resources, an MDAF 160 for predicting a deficiency of the network slice constituent not being able to satisfy the intent, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Non-transitory computer-readable media excludes transitory signals. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of network configuration, comprising:
receiving, at a network management function, an intent for a network slice constituent including a lower threshold and an upper threshold for performance of the network slice constituent;
configuring computing resources for the network slice constituent to satisfy the intent based on expected performance of the computing resources;
receive feedback with respect to actual performance of the network slice constituent;
determining, based on analysis of the feedback by a management data analytics function (MDAF), a predicted deficiency of the network slice constituent not being able to satisfy the intent; and
modifying the configuration of the computing resources based on the feedback and the predicted deficiency to satisfy the intent.

2. The method of claim 1, wherein receiving feedback with respect to actual performance of the network slice constituent comprises monitoring the performance of the network within the lower threshold and the upper threshold.

3. The method of claim 1, wherein determining the deficiency of the network slice constituent not being able to satisfy the intent comprises receiving a prediction that a likelihood of satisfying the intent is less than a threshold.

4. The method of claim 1, wherein determining the predicted deficiency of the network slice constituent comprises training a machine learning model at the MDAF to predict a demand on the network slice constituent.

5. The method of claim 4, wherein the demand on the network slice constituent is a network traffic level.

6. The method of claim 1, wherein modifying the configuration of the computing resources based on the feedback and the predicted deficiency to satisfy the intent comprises allocating additional computing resources to the network slice constituent to increase a capacity of the network slice constituent to satisfy the intent.

7. The method of claim 1, wherein the predicted deficiency is with respect to a constraint on a cost or efficiency of the intent, and wherein modifying the configuration of the computing resources comprises reducing an allocation of computing resources to satisfy the intent at a lower cost.

8. The method of claim 1, wherein determining the predicted deficiency of the network slice constituent with respect to the intent comprises receiving a recommended action from the MDAF to satisfy the intent.

9. The method of claim 1, wherein receiving feedback with respect to actual performance of the network function comprises receiving feedback at two or more levels of: a network function management function (NFMF), a network slice subnet management function (NSSMF), or a network slice management function (NSMF).

10. A system for network configuration, comprising:
one or more memories, individually or in combination, having computer-executable instructions stored thereon; and
one or more processors, individually or in combination, configured to execute the computer-executable instructions to instantiate:
a network management function configured to:
receive an intent for a network slice constituent including a lower threshold and an upper threshold for performance of the network slice constituent;
configure computing resources for the network slice constituent to satisfy the intent based on expected performance of the computing resources;

determine, based on analysis of feedback with respect to actual performance of the network slice constituent by a management data analytics function (MDAF), a predicted deficiency of the network slice constituent not being able to satisfy the intent; and modify the configuration of the computing resources based on the feedback and the predicted deficiency to satisfy the intent; and the MDAF configured to:

receive feedback with respect to actual performance of the network slice constituent; and predict a deficiency of the network slice constituent not being able to satisfy the intent based on analysis of the feedback.

11. The system of claim 10, wherein the feedback with respect to actual performance of the network slice constituent comprises performance metrics within the lower threshold and the upper threshold.

12. The system of claim 10, wherein the MDAF is configured to predict a likelihood of the configured network slice constituent satisfying the intent.

13. The system of claim 10, wherein the MDAF is configured with a trained machine learning model to predict a demand on the network slice constituent.

14. The system of claim 13, wherein the demand on the network slice constituent is a network traffic level.

15. The system of claim 10, wherein the network management function is configured to allocate additional computing resources to the network slice constituent to increase a capacity of the network slice constituent to satisfy the intent.

16. The system of claim 10, wherein the predicted deficiency is with respect to a constraint on a cost or efficiency of the intent, and wherein the network management function is configured to reduce an allocation of computing resources to satisfy the intent at a lower cost.

17. The system of claim 10, wherein the MDAF is configured to provide a recommended action to satisfy the intent.

18. A non-transitory computer-readable medium storing computer executable instructions for intent based network slice management, comprising the computer executable instructions to:

receive, at a network management function, an intent for a network slice constituent including a lower threshold and an upper threshold for performance of the network slice constituent;

configure computing resources for the network slice constituent to satisfy the intent based on expected performance of the computing resources;

receive feedback with respect to actual performance of the network slice constituent;

determine, based on analysis of the feedback by a management data analytics function (MDAF), a predicted deficiency of the network slice constituent not being able to satisfy the intent; and modify the configuration of the computing resources based on the feedback and the predicted deficiency to satisfy the intent.

19. The non-transitory computer-readable medium of claim 18, wherein the computer executable instructions to receive feedback with respect to actual performance of the network slice constituent comprise the computer executable instructions to monitor the performance of the network within the lower threshold and the upper threshold.

* * * * *